US008699479B2

(12) United States Patent
Lee

(10) Patent No.: US 8,699,479 B2
(45) Date of Patent: Apr. 15, 2014

(54) SERVER, SYSTEM AND METHOD THAT PROVIDING ADDITIONAL CONTENTS

(75) Inventor: Joong-Yun Lee, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 315 days.

(21) Appl. No.: 12/810,405

(22) PCT Filed: Aug. 18, 2008

(86) PCT No.: PCT/KR2008/004789
§ 371 (c)(1),
(2), (4) Date: Jun. 24, 2010

(87) PCT Pub. No.: WO2009/082081
PCT Pub. Date: Jul. 2, 2009

(65) Prior Publication Data
US 2010/0278170 A1    Nov. 4, 2010

(30) Foreign Application Priority Data

Dec. 26, 2007    (KR) .................. 10-2007-0137816

(51) Int. Cl.
*H04W 4/00*    (2009.01)
*H04J 3/00*    (2006.01)

(52) U.S. Cl.
USPC ............ 370/345; 370/314; 370/326; 370/336

(58) Field of Classification Search
None
See application file for complete search history.

(56) References Cited

U.S. PATENT DOCUMENTS

| | | | | |
|---|---|---|---|---|
| 5,978,835 A * | 11/1999 | Ludwig et al. | ............... | 709/204 |
| 6,396,805 B2 * | 5/2002 | Romrell | ............... | 370/216 |
| 6,667,992 B1 * | 12/2003 | Yanagawa | ............... | 370/490 |
| 6,948,131 B1 * | 9/2005 | Neven et al. | ............... | 715/753 |
| 7,222,186 B2 * | 5/2007 | Kobayashi | ............... | 709/235 |
| 7,266,611 B2 * | 9/2007 | Jabri et al. | ............... | 709/231 |
| 7,292,610 B2 * | 11/2007 | Toida et al. | ............... | 370/535 |

(Continued)

FOREIGN PATENT DOCUMENTS

| JP | 10-313449 | 11/1998 |
|---|---|---|
| JP | 2000-125270 | 4/2000 |

(Continued)

OTHER PUBLICATIONS

International Search Report for PCT/KR2008/004789.

(Continued)

*Primary Examiner* — Jae Y Lee
*Assistant Examiner* — Andrew Oh
(74) *Attorney, Agent, or Firm* — Lowe Hauptman & Ham, LLP

(57) ABSTRACT

Disclosed is a server, a system, and a method for providing additional content simultaneously with main content. The system includes: a server for multiplexing a second content with a first content which is streaming-transmitted, and streaming-transmitting, to a terminal, a mixed content produced by multiplexing the second content with the first content; and the terminal for receiving the mixed content, demultiplexing the mixed content to separate the second content from the first content, streaming-reproducing the first content, and storing the separated second content therein. Accordingly, the system does not need a configuration of another system for providing additional content, which presents separate conditions for providing the additional content and determines if the separate conditions are satisfied. Namely, if a condition for receiving only a particular period of the particular content is satisfied, a user of the terminal can receive and use the additional content along with the particular content.

4 Claims, 4 Drawing Sheets

(56) References Cited

U.S. PATENT DOCUMENTS

| | | | |
|---|---|---|---|
| 7,457,850 B1* | 11/2008 | Ukigawa et al. | 709/219 |
| 7,519,470 B2* | 4/2009 | Brasche et al. | 701/457 |
| 7,948,960 B2* | 5/2011 | Okamoto | 370/343 |
| 2001/0014898 A1* | 8/2001 | Terakado et al. | 707/513 |
| 2003/0021298 A1* | 1/2003 | Murakami et al. | 370/535 |
| 2003/0028565 A1* | 2/2003 | Landsman et al. | 707/513 |
| 2004/0042440 A1* | 3/2004 | McGowan | 370/345 |
| 2004/0088739 A1* | 5/2004 | Shimoji et al. | 725/135 |
| 2004/0093327 A1* | 5/2004 | Anderson et al. | 707/3 |
| 2005/0083929 A1* | 4/2005 | Salo et al. | 370/389 |
| 2005/0141410 A1* | 6/2005 | Zhang et al. | 370/206 |
| 2005/0190697 A1* | 9/2005 | Dohi et al. | 370/235 |
| 2005/0226592 A1* | 10/2005 | Saitoh et al. | 386/46 |
| 2006/0039482 A1* | 2/2006 | Cho | 375/240.26 |
| 2006/0062297 A1* | 3/2006 | Sugiyama | 375/240.12 |
| 2006/0064645 A1* | 3/2006 | Neven et al. | 715/753 |
| 2006/0104255 A1* | 5/2006 | Kido et al. | 370/345 |
| 2006/0224445 A1* | 10/2006 | Axe et al. | 705/14 |
| 2006/0268913 A1* | 11/2006 | Singh et al. | 370/412 |
| 2007/0041407 A1* | 2/2007 | Suzuki | 370/522 |
| 2007/0133609 A1* | 6/2007 | Moore et al. | 370/484 |
| 2007/0174474 A1* | 7/2007 | Zhong et al. | 709/230 |
| 2007/0245010 A1* | 10/2007 | Arn et al. | 709/223 |
| 2007/0266170 A1* | 11/2007 | Mockett | 709/231 |
| 2007/0280302 A1* | 12/2007 | Okamoto | 370/535 |
| 2007/0286126 A1* | 12/2007 | Prakash et al. | 370/331 |
| 2007/0298711 A1* | 12/2007 | Ogushi | 455/39 |
| 2008/0010382 A1* | 1/2008 | Ratakonda et al. | 709/231 |
| 2008/0253276 A1* | 10/2008 | Lee et al. | 370/203 |
| 2008/0310365 A1* | 12/2008 | Ergen et al. | 370/331 |
| 2008/0310446 A1* | 12/2008 | Bellwood et al. | 370/468 |
| 2009/0165057 A1* | 6/2009 | Miller et al. | 725/68 |
| 2010/0094710 A1* | 4/2010 | Ramakrishna | 705/14.64 |
| 2010/0232432 A1* | 9/2010 | Joung et al. | 370/392 |

FOREIGN PATENT DOCUMENTS

| | | |
|---|---|---|
| KR | 1020000036934 | 7/2000 |
| KR | 1020060054647 | 5/2006 |
| KR | 1020060088437 | 8/2006 |

OTHER PUBLICATIONS

Office action from JPO mailed Oct. 2, 2012 for JP 2010-540547.

* cited by examiner

SERVER, SYSTEM AND METHOD THAT PROVIDING ADDITIONAL CONTENTS

CROSS REFERENCE TO RELATED APPLICATION

This application claims the priority of Korean Patent Application No. 10-2007-0137816, filed on Dec. 26, 2007 in the KIPO (Korean Intellectual Property Office), the disclosure of which is incorporated herein in their entirety by reference. Further, this application is the National Phase application of International Application No. PCT/KR2008/004789, filed Aug. 18, 2008, which designates the United States and was published in English. Each of these applications is hereby incorporated by reference in their entirety into the present application.

TECHNICAL FIELD

The present invention relates to a system which can simultaneously provide additional content along with main content.

Namely, the present invention relates to a system for enabling the use of other additional contents when receiving particular content for a particular time or during a particular period, and viewing the received content or performing other functions related to the received content.

Specifically, the present invention relates to a system for transmitting additional content, such as a coupon, a bell sound, etc., along with main content when transmitting the main content by using a rich medium.

BACKGROUND ART

With the spread of the wireless Internet and with advances in mobile terminal technology, there has been an increasing number of people enjoying digital players (i.e. digital reproduction devices) by using mobile terminals. Particularly, a mobile terminal employing Wideband Code Division Multiple Access (WCDMA), which has recently been popularized, has processing gain increasing with an increase in data transmission bandwidth. Therefore, the mobile terminal employing WCDMA enables more convenient use of various digital contents, such as music, games, the movies, electronic commerce, etc.

Before actively using contents through a mobile terminal, service users were satisfied with only the fact that various contents can be used through a mobile terminal. However, with recent advances in communication technology as described above, there has been a requirement for rich media having contents with more various reproduction formats.

When providing a communication service, it is usual that a provider selling particular content bundles different contents to sell the bundled contents together, or provides different contents for nothing, or separately provides a discount coupon, etc., according to a marketing strategy of the provider.

In order to more effectively apply a sales method as described above to consumers, it should be simple, easy, and intuitive to provide additional content according to the degree to which consumers consume particular content. Namely, if the particular content is consumed by a predetermined time or by a predetermined volume, the additional content corresponding to the particular content should also be able to be provided by the predetermined time or by the predetermined volume.

However, in a conventional case, as a scheme for providing particular content along with additional content, a scheme is used which gives authority enabling a consumer to receive the additional content for nothing after downloading the particular content or transmits the additional content to a consumer after downloading the particular content.

DISCLOSURE

Technical Problem

Accordingly, the present invention has been made to solve the above-mentioned problems occurring in the prior art, and it is an object of the present invention to provide a server, a system, and a method for providing additional content along with particular content, which solve the inconvenience that whether received information satisfies a particular condition should be determined upon receiving information on the reception and viewing of the particular content.

Namely, an object of the present invention is to provide a content providing system for providing an additional content, the content providing system including: a server for multiplexing a second content with a first content which is streaming-transmitted, and streaming-transmitting, to a terminal, a mixed content produced by multiplexing the second content with the first content; and the terminal for receiving the mixed content, demultiplexing the mixed content to separate the second content from the first content, streaming-reproducing the first content, and storing the separated second content therein.

Technical Solution

In accordance with a first aspect of the present invention, there is provided a content providing system for providing an additional content, the content providing system including: a server for multiplexing a second content with a first content which is streaming-transmitted, and streaming-transmitting, to a terminal, a mixed content produced by multiplexing the second content with the first content; and the terminal for receiving the mixed content, demultiplexing the mixed content to separate the second content from the first content, streaming-reproducing the first content, and storing the separated second content therein.

Preferably, the server multiplexes the second content with the first content during a part of a reproduction period of the first content, and the multiplexing corresponds to time-division multiplexing.

More preferably, the mixed content includes information on a starting point of time and an end point of time when the second content is multiplexed with the first content, a total length of the second content, a type of a medium of the second content, and an effective period of being able to reproduce the second content.

More preferably, the server includes: a content providing unit for providing the first content and the second content; a multiplexing unit for multiplexing the first content and the second content provided by the content providing unit; and a transmission unit for transmitting the multiplexed contents to the terminal.

More preferably, the terminal includes: a receiving unit for receiving the mixed content; a demultiplexing unit for demultiplexing the mixed content received by the receiving unit and separating the second content from the first content; a reproduction unit for reproducing the first content; and a storage unit for storing the second content therein.

In accordance with a second aspect of the present invention, there is provided a content providing server for providing an additional content which provides two or more contents to a terminal, the content providing server including: a server for multiplexing a second content with a first content during a predetermined reproduction period of the first content streaming-transmitted to the terminal, and streaming-transmitting, to the terminal, a mixed content produced by multiplexing the second content with the first content.

Preferably, the server multiplexes the second content with the first content during a part of a reproduction period of the first content, and the multiplexing corresponds to time-division multiplexing.

More preferably, the mixed content includes information on a starting point of time and an end point of time when the second content is multiplexed with the first content, a total length of the second content, a type of a medium of the second content, and an effective period of being able to reproduce the second content.

More preferably, the server includes: a content providing unit for providing the first content and the second content; a multiplexing unit for multiplexing the first content and the second content provided by the content providing unit; and a transmission unit for transmitting the multiplexed contents to the terminal.

In accordance with a third aspect of the present invention for achieving the above objects, there is provided a content providing method for providing an additional content which transmits both a first content which is streaming-transmitted and a second content corresponding to the additional content from a server to a terminal, the content providing method including the steps of: multiplexing the second content with the first content during a reproduction period of the first content, and producing a mixed content, by a server; transmitting the mixed content from the server to the terminal; and receiving the mixed content, and demultiplexing the mixed content to separate the second content from the first content, by the terminal.

Preferably, the server multiplexes the second content with the first content during a part of a reproduction period of the first content, and the multiplexing corresponds to time-division multiplexing.

More preferably, the mixed content includes information on a starting point of time and an end point of time when the second content is multiplexed with the first content, a total length of the second content, a type of a medium of the second content, and an effective period of being able to reproduce the second content.

More preferably, the content providing method further includes a step of reproducing the first content and storing the second content by the terminal.

In accordance with a fourth aspect of the present invention, there is provided a content providing system for providing an additional content, the content providing system including: a server for multiplexing a second content with a first content transmitted in a data stream, and transmitting, to a terminal, a data stream of a mixed content produced by multiplexing the second content with the first content; and the terminal for receiving the mixed content, demultiplexing the mixed content to separate the second content from the first content, and storing the first content and the second content therein.

In accordance with a fifth aspect of the present invention, there is provided a content providing server for providing an additional content which provides two or more contents to a terminal, the content providing server including: a server for multiplexing a second content with a first content during a predetermined reproduction period of the first content transmitted in a data stream to the terminal, and transmitting, to the terminal, a data stream of a mixed content produced by multiplexing the second content with the first content.

In accordance with a sixth aspect of the present invention, there is provided a content providing method for providing an additional content which transmits both a first content transmitted in a data stream and a second content corresponding to the additional content from a server to a terminal, the content providing method including the steps of: inquiring and checking if the first content and the second content are stored in the terminal by the server; transmitting, to the terminal, a part of the second content corresponding to a stored part of the first content when the part of the first content is stored in the terminal but the second content is not stored therein; multiplexing a remaining part of the second content corresponding to a remaining part of the first content with the remaining part of the first content not stored in the terminal, and producing a mixed content, when a part of the first content and the second content corresponding to the part of the first content are stored in the terminal; transmitting the mixed content to the terminal; and receiving the mixed content, demultiplexing the mixed content to separate the remaining part of the second content from the remaining part of the first content, combining the part of the first content with the remaining part of the first content, combining the part of the second content with the remaining part of the second content, and storing therein the first content and the second content, by the terminal.

In accordance with a seventh aspect of the present invention, there is provided a content providing method for providing an additional content which transmits both a first content transmitted in a data stream and a second content corresponding to the additional content from a server to a terminal, the content providing method including the steps of: inquiring and checking if the first content and the second content are stored in the terminal by the server; multiplexing the entire second content with a remaining part of the first content not stored in the terminal, and producing a mixed content, when the part of the first content is stored in the terminal but the second content is not stored therein; transmitting the mixed content to the terminal; and receiving the mixed content, demultiplexing the mixed content to separate the second content from the remaining part of the first content, and storing therein both the first content produced by combining the part of the first content with the remaining part of the first content and the second content, by the terminal.

Preferably, the terminal streaming-reproduces the first content.

Advantageous Effects

According to the present invention, when receiving particular content for a particular time, a user of the terminal can receive additional content included in the mixed content for the particular time simultaneously with the particular content, and therefore can use the additional content.

Accordingly, a provider can combine additional content with particular content, and then sell the combined contents, so that the provider can more effectively advertise the particular content and promote the selling of it.

Also, even when receiving only particular content, a consumer can receive and use additional content simultaneously with the particular content. Therefore, the consumer can find a way to more efficiently use contents.

Also, according to the present invention, the additional content is multiplexed with the main content by inserting the additional content into the main content while regularly dispersing the additional content in a data stream of the main content. Accordingly, the content providing system of the invention does not need a configuration of another system for providing additional content, which presents separate conditions for providing the additional content and determines if the separate conditions are satisfied. Namely, if a condition for receiving only a particular period of the particular content is satisfied, a consumer can receive and use the additional content along with the particular content.

BRIEF DESCRIPTION OF THE DRAWINGS

The foregoing and other objects, features and advantages of the present invention will become more apparent from the following detailed description when taken in conjunction with the accompanying drawings in which.

BEST MODE

Mode for Invention

In accordance with a first aspect of the present invention, there is provided a content providing system for providing an additional content, the content providing system including: a server for multiplexing a second content with a first content which is streaming-transmitted, and streaming-transmitting, to a terminal, a mixed content produced by multiplexing the second content with the first content; and the terminal for receiving the mixed content, demultiplexing the mixed content to separate the second content from the first content, streaming-reproducing the first content, and storing the separated second content therein.

In accordance with a second aspect of the present invention, there is provided a content providing server for providing an additional content which provides two or more contents to a terminal, the content providing server including: a server for multiplexing a second content with a first content during a predetermined reproduction period of the first content streaming-transmitted to the terminal, and streaming-transmitting, to the terminal, a mixed content produced by multiplexing the second content with the first content.

In accordance with a third aspect of the present invention for achieving the above objects, there is provided a content providing method for providing an additional content which transmits both a first content which is streaming-transmitted and a second content corresponding to the additional content from a server to a terminal, the content providing method including the steps of: multiplexing the second content with the first content during a reproduction period of the first content, and producing a mixed content, by a server; transmitting the mixed content from the server to the terminal; and receiving the mixed content, and demultiplexing the mixed content to separate the second content from the first content, by the terminal.

Hereinafter, exemplary embodiments of the present invention will be described with reference to the accompanying drawings.

Figure 1:
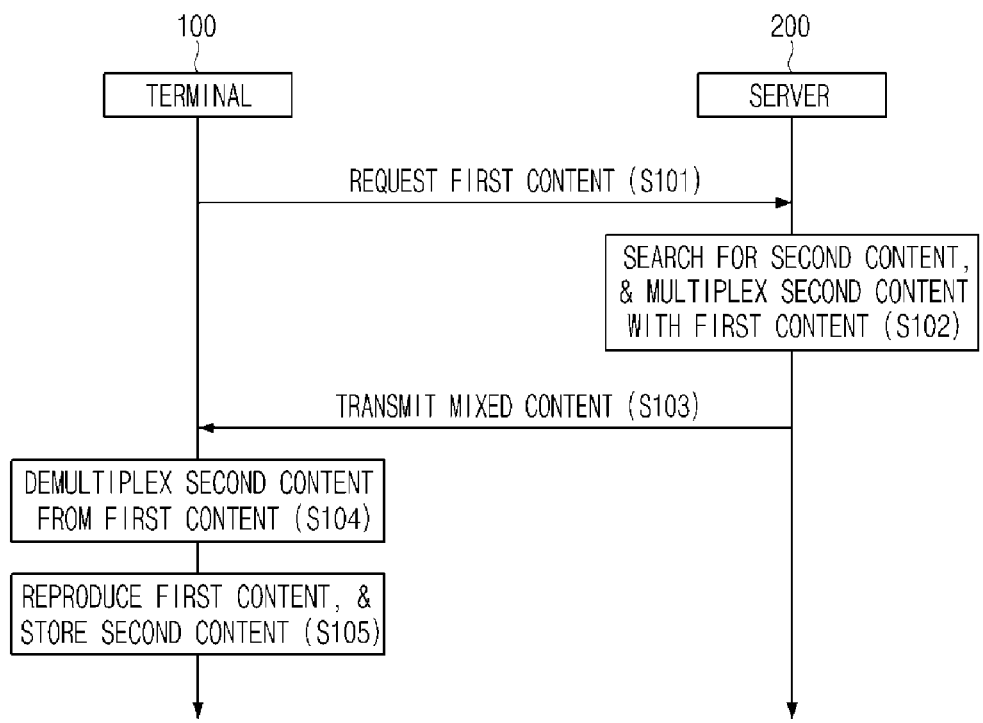
FIG. 1 is a flow diagram showing a content providing method for providing additional content according to an embodiment of the present invention.

FIG. 1 is a flow diagram showing a content providing method for providing additional content according to an embodiment of the present invention.

In FIG. 1, a terminal 100 and a server 200 are illustrated. The terminal 100 sends a request for reproducing predetermined content to the server 200. Content whose transmission and reproduction is requested by the terminal 100 is content transmitted in a real-time streaming scheme. Referring to FIG. 1, the terminal 100 sends a request for streaming-transmitting and reproducing first content (i.e. main content) to the server 200 (S101). When there is the request for streaming-reproducing the first content, the server 200 selects second content (i.e. additional content), or multiplexes pre-designated second content with the first content during a streaming-transmission period of the first content, and then transmits the second content which is selected or multiplexed with the first content. Namely, the server 200 multiplexes the second content with the first content while dispersing the second content in a data stream in which the first content is transmitted, and produces mixed content (S102). Then, the server 200 streaming-transmits the mixed content to the terminal (S103).

For example, the multiplexing as described above may be time-division multiplexing. Namely, the multiplexing can be performed such that packets into which the second content is divided are inserted at intervals into a packet stream of the first content.

A data stream of the first content as a rich medium may be a stream in a Simple Aggregation Format (SAF) of Lightweight Application Scene Representation (LASeR) of Moving Picture Experts Group 4 (MPEG4).

The terminal 100 receives and demultiplexes the mixed content, and separates the second content from the first content. The terminal 100 streaming-reproduces the first content in real-time, and stores the second content in a storage unit included in the terminal 100. As a result of receiving the first content for a predetermined time, if all data of the second content is received which is regularly dispersed during a predetermined period of a data stream of the first content, a user of the terminal 100 can use the second content.

Accordingly, only if the terminal receives a data stream of the first content during a predetermined period, it can receive a part or all of the second content. Due to the configuration as described above, the advertisement and consumption promotion of the first content can be achieved by increasing the demand of the first content by using the second content corresponding to additional content.

The mixed content includes information on a starting point of time and an end point of time when the second content is multiplexed with the data stream of the first content, a total length of the second content, a type of a medium of the second content, an effective period of being able to reproduce the second content, and the like.

The terminal 100 demultiplexes the mixed content, and separates the second content from the first content. The separated first content is reproduced by terminal 100, and the second content is stored in a content storage unit.

Figure 2:
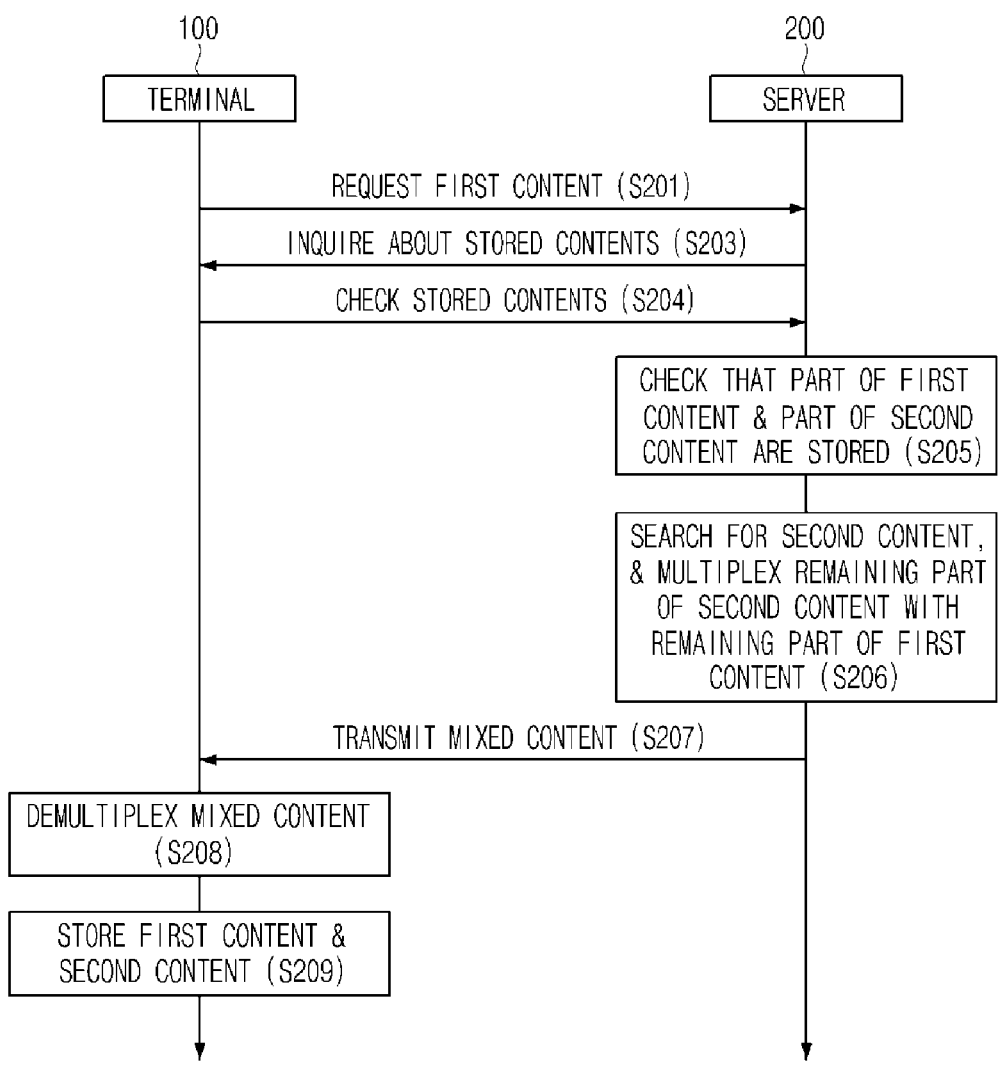
FIG. 2 is a flow diagram showing a content providing method for providing additional content according to a second embodiment of the present invention.
Figure 3:
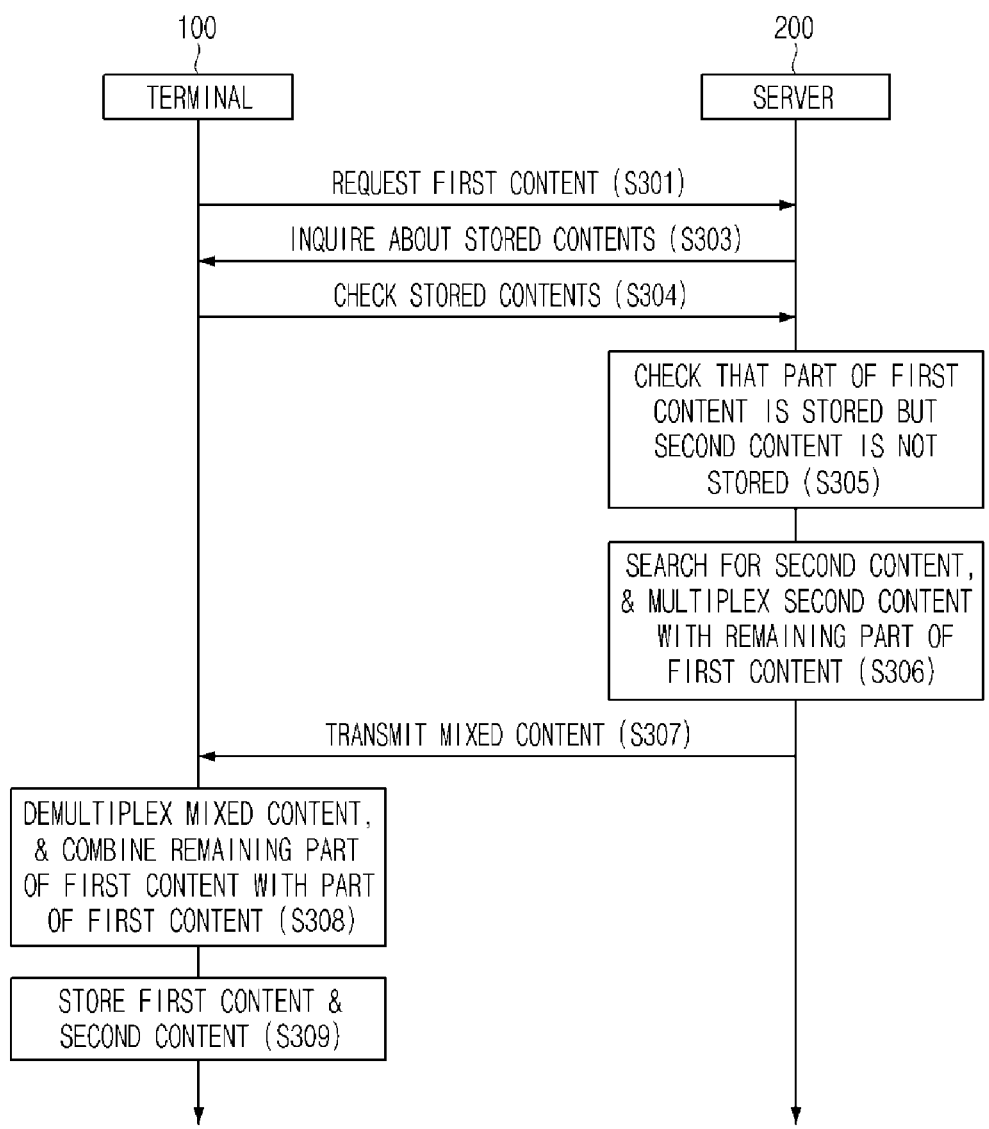
FIG. 3 is a flow diagram showing a content providing method for providing additional content according to a third embodiment of the present invention.

FIG. 2 is a flow diagram showing a content providing method for providing additional content according to a second embodiment of the present invention. FIG. 3 is a flow diagram showing a content providing method for providing additional content according to a third embodiment of the present invention.

Referring to FIG. 2, a description will be made of the content providing method for providing additional content according to a second embodiment of the present invention. When the terminal 100 sends a request for first content to the server 200, before producing mixed content, the server 200 checks if there exist the first content and second content previously stored in the terminal 100 (S203 and S204). When it is checked in step S205 that both a part of the first content and a part of the second content are stored in the terminal 100, the server 200 multiplexes a remaining part of the second content with a remaining part of the first content, and produces mixed content (S206). When receiving the mixed content (S207), the terminal 100 demultiplexes the mixed content, and separates the remaining part of the second content from the remaining part of the first content (S208). Then, the terminal 100 combines the part of the first content with the remaining part of the first content to produce the first content, and stores the first content therein (S209). Also, the terminal 100 combines the part of the second content with the remaining part of the second content to produce the second content, and stores the second content therein (S209). At this time, the terminal 100 may streaming-reproduce the first content through a buffer instead of storing all of the first content therein.

Referring to FIG. 3, a description will be made of the content providing method for providing additional content according to a third embodiment of the present invention. When the terminal 100 sends a request for first content to the server 200 (S301), before producing mixed content, the server 200 checks if there exist the first content and second content previously stored in the terminal 100 (S303 and S304). When a part of the first content is stored in the terminal 100 but the second content which has already been deleted is not stored in the terminal 100 (S305), the server 200 multiplexes all of the second content with a remaining part of the first content, and produces mixed content (S306). Upon receiving the mixed content, the terminal 100 demultiplexes the mixed content, and separates the second content from the remaining part of the first content (S308). Then, the terminal 100 combines the part of the first content with the remaining part of the first content to produce the first content (S308), and stores both the first content and the second content therein (S309). At this time, the terminal 100 may streaming-reproduce the first content through a buffer instead of storing all of the first content therein.

Figure 4:
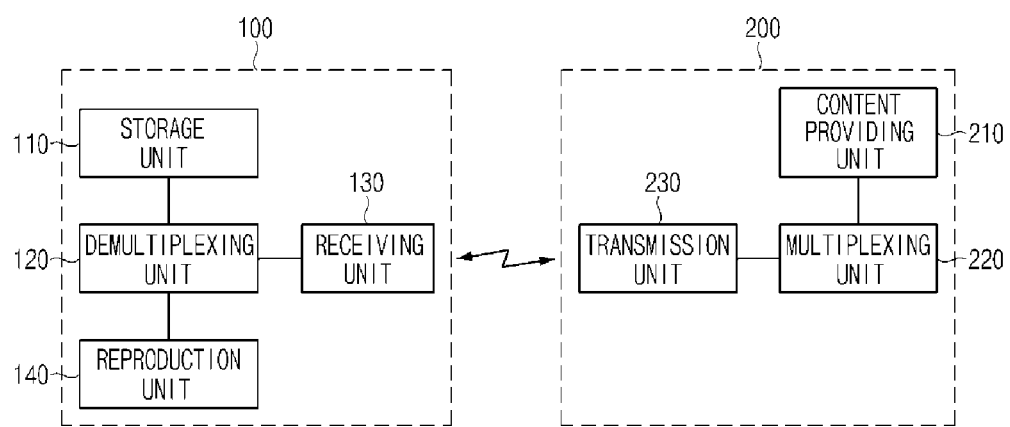
FIG. 4 is a block diagram illustrating a configuration of a content providing system for providing additional content according to an embodiment of the present invention.

FIG. 4 is a block diagram illustrating a configuration of a content providing system for providing additional content according to an embodiment of the present invention.

The content providing system for providing additional content includes the terminal 100 and the server 200. Herein, the terminal 100 includes a storage unit 110, a demultiplexing unit 120, a receiving unit 130, and a reproduction unit 140. The server 200 includes a content providing unit 210, a multiplexing unit 220, and a transmission unit 230. The content providing unit 210 selects second content to be provided in addition to first content requested by the terminal 100, and provides the selected second content to the multiplexing unit 220. Then, the multiplexing unit 220 multiplexes the second content with the first content to produce mixed content, and provides the mixed content to the transmission unit 230. Then, the transmission unit 230 transmits the mixed content to the terminal 100.

The terminal 100 receives the mixed content produced by the multiplexing as described above through the receiving unit 130, and separates the second content from the first content through the demultiplexing unit 120. The terminal 100 produces the separated first content, and receives the second content multiplexed with a data stream of the first content and stores the received second content in the storage unit 110 thereof.

INDUSTRIAL APPLICABILITY

A content providing system for providing an additional content according to the present invention includes: a server for multiplexing a second content with a first content which is streaming-transmitted, and streaming-transmitting, to a terminal, a mixed content produced by multiplexing the second content with the first content; and the terminal for receiving the mixed content, demultiplexing the mixed content to separate the second content from the first content, streaming-reproducing the first content, and storing the separated second content therein.

Due to the features as described above, when receiving particular content for a particular time, a user of the terminal can receive additional content included in the mixed content for the particular time simultaneously with the particular content, and therefore can use the additional content.

Accordingly, a provider can combine additional content with particular content, and then sell the combined contents, so that the provider can more effectively advertise the particular content and promote the selling of it.

Also, even when receiving only particular content, a consumer can receive and use additional content simultaneously with the particular content. Therefore, the consumer can find a way to more efficiently use contents.

Also, according to the present invention, the additional content is multiplexed with the main content by inserting the additional content into the main content while regularly dispersing the additional content in a data stream of the main content. Accordingly, the content providing system of the invention does not need a configuration of another system for providing additional content, which presents separate conditions for providing the additional content and determines if the separate conditions are satisfied. Namely, if a condition for receiving only a particular period of the particular content is satisfied, a consumer can receive and use the additional content along with the particular content.

Hence, the present invention has utility and practical use in an industrial field of providing communication services.

Although several exemplary embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A content providing method for providing an additional content by transmitting, from a server to a terminal, both a first content transmitted in a data stream and a second content corresponding to the additional content the content providing method comprising:

checking, by the server, whether or not any part of the first content and the second content are stored in the terminal, in response to a request signal for the first content;

when a first part of the first content is stored in the terminal but a corresponding first part of the second content is not stored therein, transmitting, by the server, the corresponding first part of the second content to the terminal;

multiplexing, by the server, a second part of the first content not stored in the terminal with a corresponding second part of the second content, to produce a mixed content;

transmitting, by the server, the mixed content to the terminal; and receiving and demultiplexing, by the terminal, the mixed content to separate the second part of the second content from the second part of the first content, combining the stored first part of the first content with the second part of the first content, combining the first part of the second content with the second part of the second content, and storing the combined first content and the combined second content in the terminal.

2. A content providing method for providing an additional content by transmitting, from a server to a terminal, both a first content transmitted in a data stream and a second content corresponding to the additional content from a server to a terminal, the content providing method comprising:
- checking, by the server, whether or not any part of the first content and the second content are stored in the terminal, in response to a request signal for the first content;
- when a first part of the first content is stored in the terminal but the second content is not stored therein, multiplexing, by the server, the entire second content with a second part of the first content which is not stored in the terminal, to produce a mixed content;
- transmitting, by the server, the mixed content to the terminal; and
- receiving, and demultiplexing, by the terminal, the mixed content to separate the second content from the second part of the first content, and storing both (i) the first content produced by combining the first and second parts of the first content and (ii) the second content in the terminal.

3. The content providing method as claimed in claim 1, wherein the terminal streaming-reproduces the first content.

4. The content providing method as claimed in claim 2, wherein the terminal streaming-reproduces the first content.

* * * * *